(12) United States Patent
Wilson

(10) Patent No.: US 6,609,592 B2
(45) Date of Patent: Aug. 26, 2003

(54) NOISE ATTENUATION PANEL

(75) Inventor: Robert Samuel Wilson, Belfast (IE)

(73) Assignee: Short Brothers PLC, Belfast (IE)

( * ) Notice: Subject to any disclaimer, the term of this patent is extended or adjusted under 35 U.S.C. 154(b) by 0 days.

(21) Appl. No.: 09/886,664

(22) Filed: Jun. 20, 2001

(65) Prior Publication Data

US 2002/0036115 A1 Mar. 28, 2002

(30) Foreign Application Priority Data

Jun. 30, 2000 (GB) ............................................. 0016149

(51) Int. Cl.[7] ................................................. E04B 1/82
(52) U.S. Cl. ....................................... 181/292; 181/293
(58) Field of Search ................................ 181/292, 290, 181/293, 294, 286, 203; 29/890.08; 428/116

(56) References Cited

U.S. PATENT DOCUMENTS 4,288,679 A    9/1981  La Rocca
5,804,030 A  * 9/1998  Jaegers et al. ............... 156/510
5,841,079 A   11/1998  Parente
5,912,442 A  * 6/1999  Nye et al. ................... 181/286
6,122,892 A    9/2000  Gonidec et al.

FOREIGN PATENT DOCUMENTS

| EP | 0 824 066 A | 2/1998 |
| GB | 1490923 | 11/1977 |
| GB | 2314526 A | 1/1998 |
| WO | WO 94/26995 | 11/1994 |

* cited by examiner

*Primary Examiner*—Kim Lockett
(74) *Attorney, Agent, or Firm*—Fulbright & Jaworski L.L.P.

(57) ABSTRACT

A noise attenuation panel used to attenuate noise in aircraft engines includes a cellular core and a facing sheet formed with an array of holes. The holes are laser drilled to provide: (i) hole size variation over the facing sheet; (ii) non-circular hole cross section; (iii) polygonal hole cross section; (iv) hole locations not contiguous with walls of the cellular core; and (v) inclined holes passing through the facing sheet in a direction inclined to the normal to the facing sheet.

29 Claims, 6 Drawing Sheets

NOISE ATTENUATION PANEL

The present invention relates to noise attenuation panels and to a method of manufacturing a noise attenuation panel.

Noise attenuation panels are widely used for attenuating noise produced by aircraft engines and are located at optimised positions in the flow ducts of aircraft engine nacelle structures. Such flow ducts primarily comprise the inlet duct, the fan duct and the nozzle assembly.

A typical noise attenuation panel comprises a sound reflecting solid backing plate or sheet, a perforate metal facing plate or sheet and a honeycomb or cellular core which is bonded between the backing and facing sheets and which partitions the air into a multiplicity of separate cells.

When the noise attenuation panel is mounted in a flow duct of an aircraft engine nacelle structure with the facing sheet exposed to sound waves generated in the duct, the sound waves become subjected to three mechanisms which result in a reduction of the sound energy by conversion thereof to heat energy, namely:

(i) friction in the facing sheet,
(ii) pressure loss when duct pressure sound waves expand into the cells of the honeycomb or cellular core, and
(iii) 'reactive' cancellation of the direct incident sound wave by the wave that is reflected from the solid backing sheet, the honeycomb cell depth being 'tuned' to the required frequency.

Noise attenuation panels are obviously important acoustically but, because of the hostile environment in which they operate, there is also an evident need for structural rigidity. As they form part of an aircraft engine nacelle structure it is important that the complete component is provided with adequate strength to withstand the inflight conditions to which an exposed area of a nacelle structure is susceptible. Moreover, noise attenuation panels are often so configured as to add strength to the nacelle structure into which they are to be installed.

The perforate facing sheets of noise attenuation panels heretofore proposed have commonly been perforated by punching or mechanical drilling. Current noise attenuation panel constructions use perforate facing sheets with holes typically of diameter between 0.020" (0.508 mm) and 0.060" (1.524 mm) positioned in an equi-spaced triangular array such as to provide open areas within the limits of 3 and 20%.

Early manufacturing procedures have included punching and drilling but they do not realistically allow for the provision of very small hole diameters and very small spacing. In metal sheets, punching for example dictates a minimum hole diameter of 0.020" (0.508 mm). Mechanical drilling can produce holes with diameters as low as 0.010" (0.254 mm), but this is highly impractical with the lowest practical hole diameter being 0.020" (0.508 mm).

In prior patent specification GB 2314526, a method of manufacturing a noise attenuation panel has been proposed in which a blank facing sheet is subjected to electron beam drilling to produce a multiplicity of drilled holes with bore diameters not greater than 0.020" (0.508 mm). The electron beam drilling it is stated may furthermore advantageously produce the multiplicity of drilled holes with bore diameters in the range of 0.002" (0.0508 mm) to 0.020" (0.508 mm).

It has furthermore been proposed in prior patent specification U.S. Pat. No. 4,850,093 to provide a perforated titanium facing sheet by laser drilling holes or perforations through the sheet. The holes are uniformly distributed over the sheet and constituted 3 to 6% of the total area of the sheet. The porosity of the facing sheet may, it is stated, be designed to meet specific flow resistances by either changing the hole size or the spacing between holes or by simultaneously changing both. A facing sheet considered to be suitable comprised holes with a hole diameter of 0.002 to 0.003", a hole spacing of 0.008 to 0.016", 11,000 to 16,000 holes per square inch and 3 to 6% open area.

In prior patent specification GB 2038410A it has been proposed to provide a noise attenuation panel for a fluid flow duct of a gas turbine aeroengine which is aimed at attenuating as many frequencies as possible by employing beneath the perforated facing sheet a Helmholtz-type resonator for frequencies at the lower end of the frequency range and tube-type resonators for higher frequencies. Attention is directed to varying the Helmholtz resonator characteristics to provide for a wide band absorption. The facing sheet has a regular array of uniformally-sized holes although it is proposed to increase the hole density by reducing the spacing between the holes at one location of the facing sheet for acoustic coupling purposes.

In prior patent specification U.S. Pat. No. 4,288,679 a laser microdrilling method is proposed which uses a power laser beam in which the surface finish and dimensional accuracy of the hole being formed is improved by heating the workpiece. The laser beam can, it is stated, be rotated about the axis of the beam to form holes having a surface finish with a dimensional accuracy better than those obtainable with conventional laser microdrilling technology.

It is an object of the present invention to provide a noise attenuation panel and a method of manufacturing the panel in which the holes in the facing sheet can, by virtue of their hole geometry and distribution, provide for noise attenuation over a wide range of frequencies to which the panel is subject when employed as a noise attenuation panel for gaseous flow ducts in gas turbine aeroengines.

The present invention according to its different aspects includes a noise attenuation panel or the manufacture of a noise attenuation panel which comprises: a cellular component part which has a front face and a rear face and a cell defining wall structure which defines a multiplicity of cells between the front face and the rear face; and a facing component part which has a front face and a rear face, extends across the ends of the cells of the cellular component part at the front face thereof with the rear face of the facing component part adjacent the front face of the cellular component part, and is provided with a multiplicity of holes which extend through the facing component part from the front face to the rear face to provide gaseous fluid communication between the cells of the cellular component part and the front face of the facing component part for the attenuation of noise generated by gaseous fluid flow at the surface of the front face of the facing component part.

According to a first aspect of the present invention, there is provided a method of manufacturing a noise attenuation panel as hereinbefore set forth, the method comprising producing, in a hole producing step, the multiplicity of holes through the facing component part in the form of an array of holes having a hole size which so varies over the facing component part as to provide optimum attenuating performance of the panel over a predetermined range of gaseous flow conditions at the front face of the facing component part.

According to a second aspect of the present invention, there is provided a method of manufacturing a noise attenuation panel as hereinbefore set forth, the method comprising producing, in a hole producing step, the multiplicity of holes through the facing component part in the form of an array of holes having a non-circular hole cross-section which is so chosen as to provide optimum combined structural strength and attenuating performance of the panel.

According to a third aspect of the present invention, there is provided a method of manufacturing a noise attenuation panel as hereinbefore set forth, wherein: the facing component part is in the form of a fibre reinforced composite comprising a matrix component and a fibre reinforcing component embodied within the matrix component; the fibre reinforcing component comprises arrays of fibres in which the fibres of each array extend in a predetermined direction in the matrix and in which the predetermined direction of the fibres of each array is different from that of the fibres of each of the other arrays; and the holes in the facing component part are so produced as to have a polygonal cross-section with sides arranged parallel to the predetermined directions of the fibres of the arrays.

According to a fourth aspect of the present invention, there is provided a method of manufacturing a noise attenuation panel as hereinbefore set forth, in which the cell defining wall structure comprises walls which define the multiplicity of cells and which terminate in end portions at the front face of the cellular component part, and drilling of the holes is so carried out that no holes are drilled at locations of the facing component part which in the assembled panel are contiguous with the end portions of the walls of the cell defining wall structure.

According to a fifth aspect of the present invention there is provided a method of manufacturing a noise attenuation panel as hereinbefore set forth, the method comprising producing, in a hole producing step, the multiplicity of holes through the facing component part in the form of an array of holes which pass through the component part from the rear face of the facing component part to the front face of the facing component part in a predetermined hole direction inclined to the normal to the front face.

In an embodiment of the invention the multiplicity of holes through the facing component part is in the form of an array of holes which pass through the component part from the rear face of the facing component part to the front face of the facing component part in a predetermined hole direction inclined to the normal to the front face. The inclination of the holes is so chosen as to provide flow paths to the cell defining structure which optimise attenuating performance of the panel.

Where the facing component part is a multi-ply structure comprising a plurality of superposed ply elements the holes may be so inclined as to offset structural weakness of the multi-ply structure in the region of the holes.

Where the panel is so located as to be subjected to gaseous fluid flow over the surface of the front face of the facing component part in a predetermined fluid flow direction the predetermined hole direction has a component along the front face of the facing component part which is in the same direction as the predetermined fluid flow direction. Furthermore, the holes may be so inclined as to reduce the tendency of the holes to become clogged by debris carried in the gaseous fluid flow over the front face of the facing component part.

According to a sixth aspect of the present invention there is provided a noise attenuation panel as hereinbefore set forth which is produced by the method according to its first, second, third and/or fourth aspect.

According to a seventh aspect of the present invention there is provided a noise attenuation panel as hereinbefore set forth which is characterised in that the multiplicity of holes through the facing component part form an array of holes having a hole size which so varies over the facing component part as to provide optimum attenuating performance of the panel over a predetermined range of gaseous flow conditions at the front face of the facing component part.

According to an eighth aspect of the present invention, there is provided a noise attenuation panel as hereinbefore set forth which is characterised in that the multiplicity of holes through the facing component part form an array of holes having a non-circular hole cross-section which is so chosen as to provide optimum combined structural strength and attenuating performance of the panel.

In an embodiment of the invention, the holes of the array have a non-circular hole cross-section which varies over the facing component part.

Furthermore, in an embodiment of the invention, the holes of the array are spaced apart with a hole spacing which varies over the facing component part.

In embodiments of the invention hereinafter to be described, the holes in the facing component part are produced by laser drilling.

In an embodiment of the invention, the method includes bringing the two component parts together in an assembly step in the formation of the noise attenuation panel, and carrying out the hole producing step prior to the assembly step. The laser drilling is then carried out using a high intensity laser which may take the form of a $CO_2$ or YAG laser.

In an embodiment of the invention, the method includes bringing the two component parts together in an assembly step in the formation of the noise attenuation panel, and carrying out the hole producing step after the assembly step. The laser drilling is then carried out using a low intensity laser which may take the form of a UV excimer laser.

In an embodiment of the invention, the panel further comprises a backing component part extending across the rear face of the cellular component, and the assembly step comprises bringing the three component parts together in the formation of a noise attenuation panel.

In an embodiment of the invention according to its fourth aspect, the method includes bringing the two component parts together in an assembly step in the formation of the noise attenuation panel, carrying out the hole producing step after the assembly step, and carrying out laser drilling under the control of an ultrasonic probe identifying wall end portion locations.

In an embodiment of the invention, the holes of the array have bore configurations which minimise blockage by debris deposited by the gaseous flow therethrough.

According to a ninth aspect, there is provided a noise attenuation panel as hereinbefore set forth, wherein: the facing component part is in the form of a fibre reinforced composite comprising a matrix component and a fibre reinforcing component embodied within the matrix component; the fibre reinforcing component comprises arrays of fibres in which the fibres of each array extend in a predetermined direction in the matrix and in which the predetermined direction of the fibres of each array is different from that of the fibres of each of the other arrays; and the holes in the facing component part are so produced as to have a polygonal cross-section with sides arranged parallel to the predetermined directions of the fibres of the arrays.

Where the arrays of reinforcing fibres comprise first, second, third and fourth arrays of fibres having fibre directions of 0°, 90° and +45° and −45°, the holes in the facing component part have an octagonal cross-section with sides arranged parallel to the fibre directions.

Where the arrays of reinforcing fibres comprise first and second arrays of fibres having fibre directions of 0° and 90°, or +45° and −45°, the holes formed in the facing component part are so produced as to have a four sided polygonal cross-section with sides arranged parallel to the fibre directions.

According to a tenth aspect of the invention, there is provided a noise attenuation panel as hereinbefore set forth, wherein no holes are provided at locations of the facing component part which in the assembled panel are contiguous with the end portions of the walls of the cell defining wall structure.

According to an eleventh aspect of the present invention there is provided a noise attenuation panel as hereinbefore set forth, wherein the multiplicity of holes through the facing component part is in the form of an array of holes which pass through the component part from the rear face of the facing component part to the front face of the facing component part in a predetermined hole direction inclined to the normal to the front face.

The multiplicity of holes through the facing component part is preferably in the form of an array of holes which pass through the component part from the rear face of the facing component part to the front face of the facing component part in a predetermined hole direction inclined to the normal to the front face. The inclination of the holes is so chosen as to provide flow paths to the cell defining structure which optimise attenuating performance of the panel.

Where the facing component part is a multi-ply structure comprising a plurality of superposed ply elements, the holes may be so inclined as to offset structural weakness of the multi-ply structure in the region of the holes.

Where the panel is so located as to be subjected to gaseous fluid flow over the surface of the front face of the facing component part in a predetermined fluid flow direction, the predetermined hole direction has a component along the front face of the facing component part which is in the same direction as the predetermined fluid flow direction. Furthermore the holes may be so inclined as to reduce the tendency of the holes to become clogged by debris carried in the gaseous fluid flow over the front face of the facing component part.

Where the facing component part is in the form of a fibre reinforced composite comprising a matrix component and a fibre reinforcing component embodied within the matrix component, the laser drilling is carried out on the composite after precuring of the matrix component.

In an embodiment of the invention, the facing component part and the cellular component part are required to follow a predetermined contour for the panel when assembled, and the precuring of the facing component part is carried out to the predetermined contour for the panel.

Furthermore, panels produced in accordance with the invention may include facing component parts with holes having two or more of the hole characteristics called for in the aforementioned different aspects of the invention.

Embodiments of the invention will now be described with reference to the accompanying drawings in which.

Figure 1:
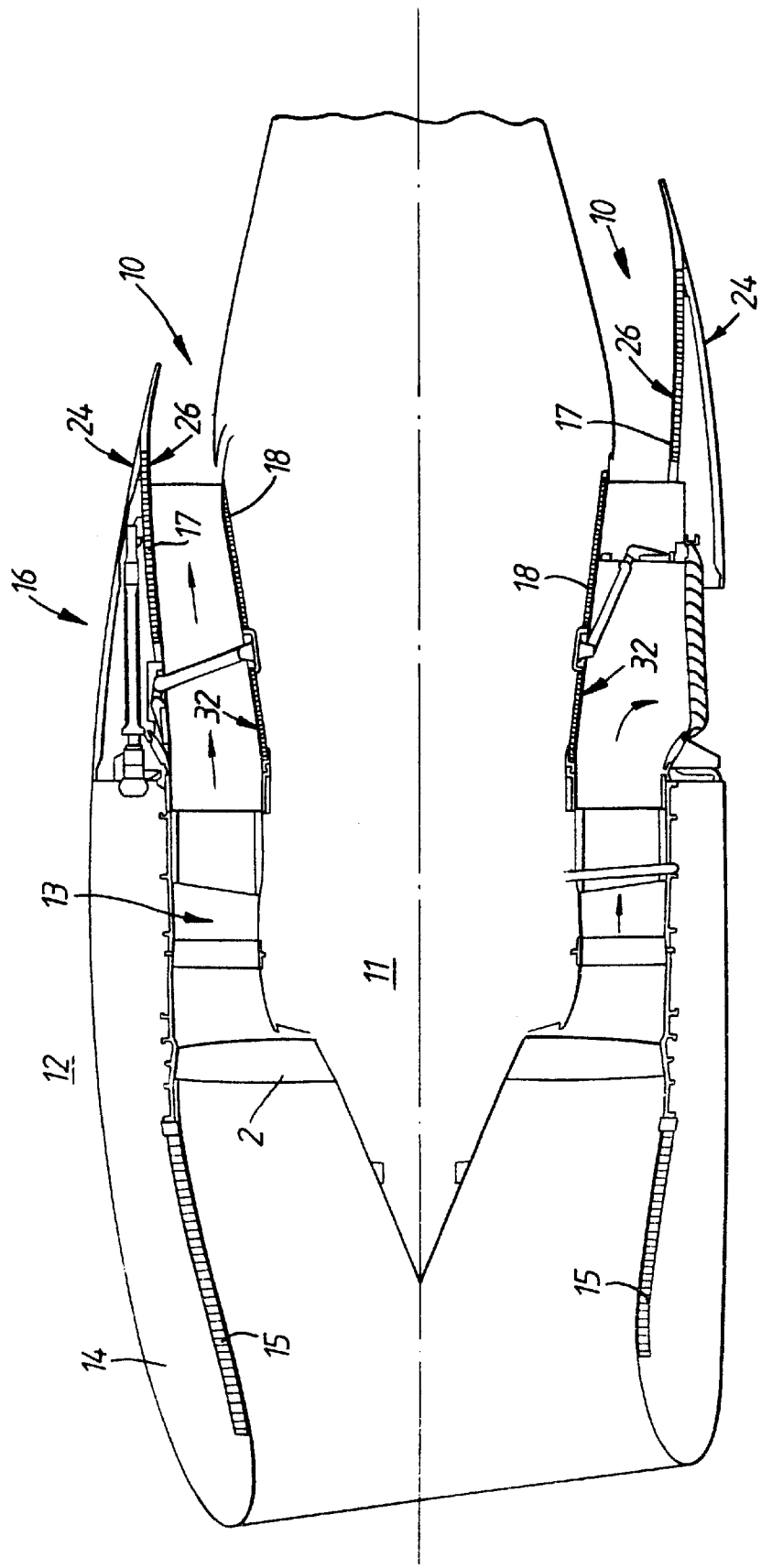
FIG. 1 is a schematic section of an aircraft propulsive power unit embodying noise attenuation panels.

Referring first to FIG. 1, the propulsive power unit illustrated comprises a core engine 11 carrying fan blades 2 and surrounded by an engine nacelle structure 12 which provides an annular fan duct 13 for conducting a high-speed gaseous fan stream to an annular outlet nozzle 10.

As will be seen, the nacelle structure 12 includes at its forward end an inlet cowl 14 provided with noise attenuation panels 15 as hitherto proposed and constructed as hereinafter to be described with reference to FIGS. 2 and 3.

The nacelle structure 12 further includes as its rearmost end a thrust reversal unit 16 shown in the upper half of FIG. 1 in a stowed position and in the lower half of FIG. 1 in the deployed position. The thrust reversal unit 16 is an integral part of the fan stream duct 13 and discharge nozzle 10.

To reduce noise emanating in the fan duct in the region of the thrust reversal unit, the inner wall 26 of the cowl 24 and the inner fan duct wall 32 are lined with noise attenuation panels 17 and 18 which may also take the form of a noise attenuation panel to be described with reference to FIGS. 2 and 3.

Figure 2:
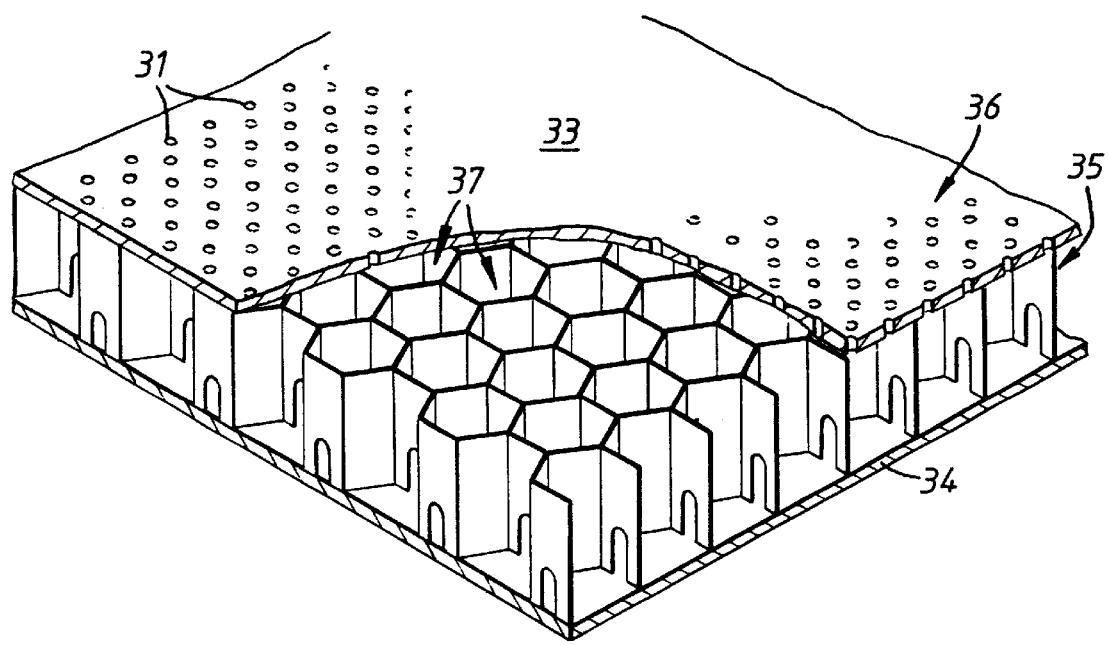
FIG. 2 is a schematic perspective view from above of a noise attenuation panel hitherto proposed for use in the power unit shown in FIG. 1.
Figure 3:
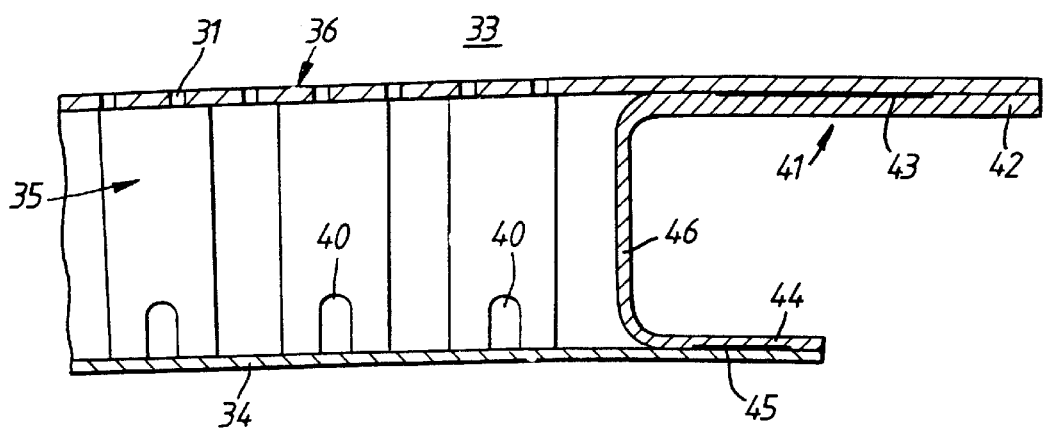
FIG. 3 is a schematic cross section of part of the panel shown in FIG. 2 secured to a supporting channel member.

Referring now to FIGS. 2 and 3, a noise attenuation panel 33 as hitherto proposed comprises a backing sheet 34, a cellular core 35 and a facing sheet 36.

The cellular core 35 comprises a multiplicity of open-ended juxtaposed cells 37 of hexagonal cross section to provide a honeycomb configuration. Alternatively, cellular cores having juxtaposed cells of other cross-sections may of course be used.

The backing sheet 34 is unperforated and made from an impermeable sheet material and is secured by an adhesive to the lower face of the cellular core 35. The facing sheet 36 is secured to the upper face of the cellular core 35 also by means of an adhesive. The cells 37 are provided with drainage slots 40 to allow for condensates to drain from the component 33.

The supporting structure for the panels 33 will usually include supporting channel members of which only one member 41 is shown in FIG. 3. The panel 33 is secured to the member 41 by bonding the facing sheet 36 to an outer face of a flange 42 of the channel member 41 using an adhesive 43 and by bonding the backing sheet 34 to the outer face of a flange 44 of the channel member 41 using an adhesive 45.

Panels 33 of arcuate form, possibly of double curvature, are embodied as structural parts at one or more locations 15, 17 and 18 of the engine illustrated in FIG. 1, each component being one of several arcuate components extending circumferentially round the nacelle structure.

The facing sheet 36 is, as shown in FIGS. 2 and 3, formed with a multiplicity of holes 31 which provide gaseous fluid communication between the cells 37 of the cellular core 35 and the front face of the sheet 36.

As previously described, the holes 31 of the facing sheet 36 of the panel 33 have hitherto been of circular cross-section, of uniform size over the surface of the facing sheet 36 and uniformally distributed over the surface of the facing sheet 36. The holes 31 have been produced by conventional mechanical drilling, laser beam drilling or electron beam drilling prior to the assembly of the panel 33, that is to say, prior to the step of bringing the backing sheet 34, the cellular core 35 and the facing sheet 36 together.

To provide for noise attenuation over a wide range of frequencies the geometry and distribution of the holes 31 is modified in accordance with one or more of the various aspects of the present invention.

Figure 4:
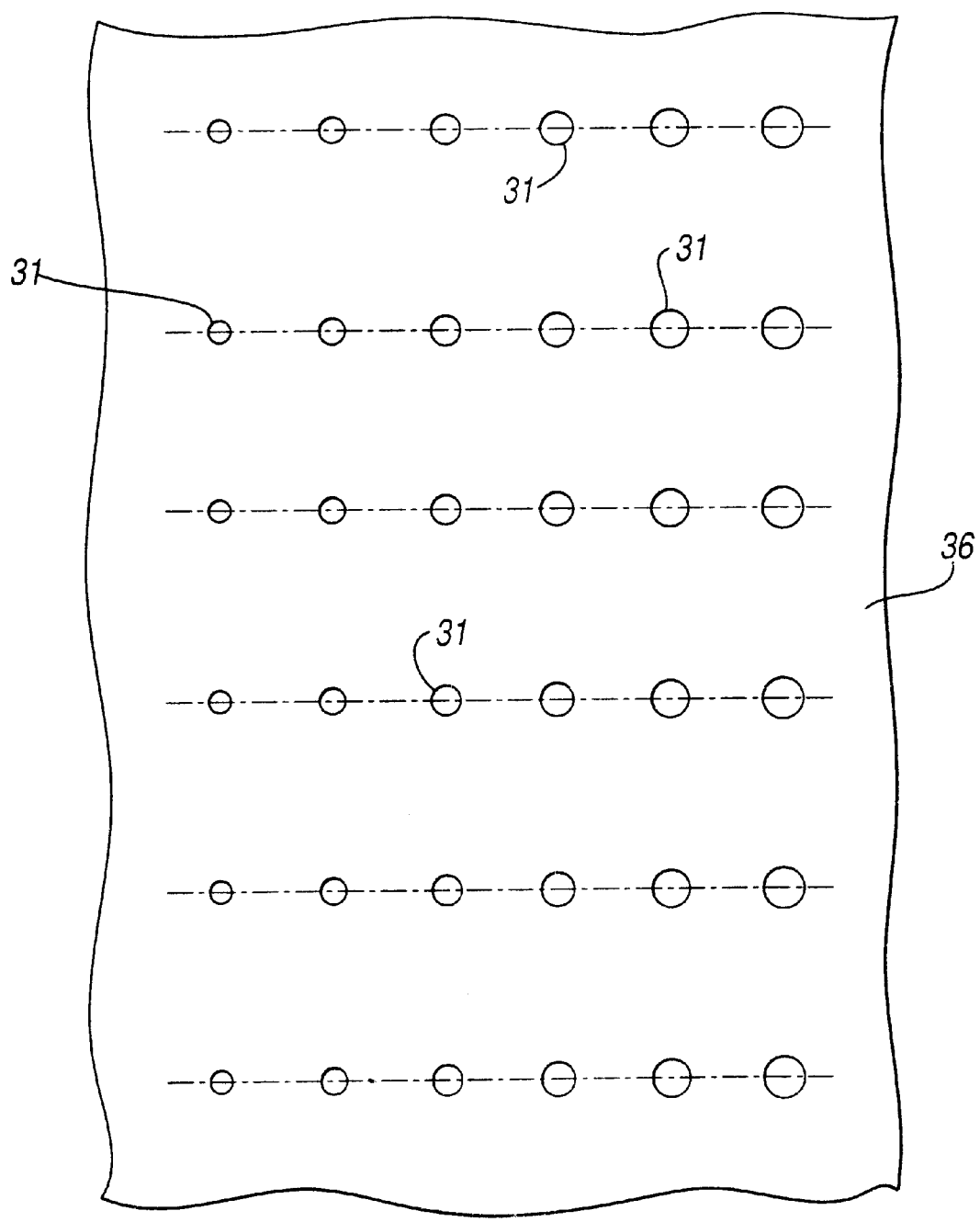
FIG. 4 is a schematic representation of a part of the facing sheet of the panel illustrated in FIGS. 2 and 3 as modified in accordance with the first and seventh aspects of the invention.

In particular, in accordance with the first and seventh aspects of the invention and as illustrated in FIG. 4 holes 31 of the facing sheet 36 take the form of an array of holes having a hole size which varies over the facing sheet 36. The hole size variation is so chosen as to provide optimum attenuating performance of the panel.

Figure 5:
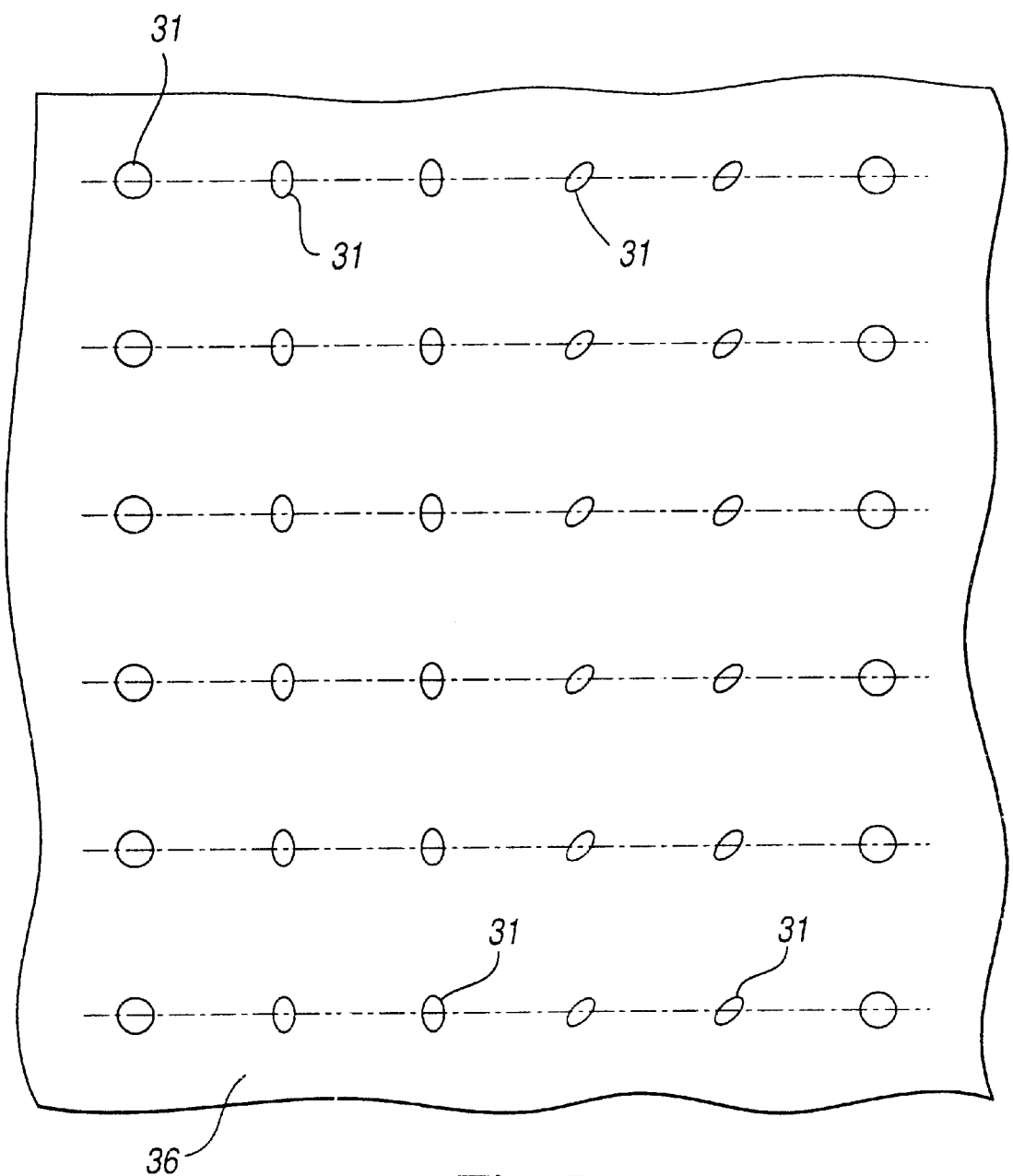
FIG. 5 is a schematic representation of part of the facing sheet of the panel illustrated in FIGS. 2 and 3 as modified in accordance with the second and eighth aspects of the invention.

In addition, or alternatively, holes 31 through the facing sheet 36 are in accordance with the second and eighth aspect of the invention and as illustrated in FIG. 5 formed as or include an array of holes having a non-circular hole cross-section.

Furthermore, in accordance with the third and ninth aspects of the invention the facing sheet 36 takes the form of a fibre reinforced composite comprising a matrix component and a fibre reinforcing component embodied within the matrix component. The fibre reinforcing component comprises arrays of fibres in which the fibres of each array extend in predetermined direction in the matrix and in which the predetermined direction of the fibres of each array is different from that of the fibres of each of the other arrays. The holes 31 in the facing sheet 36 are then so produced as to have a polygonal cross-section with sides arranged parallel to the predetermined directions of the fibres of the arrays.

Figure 6:
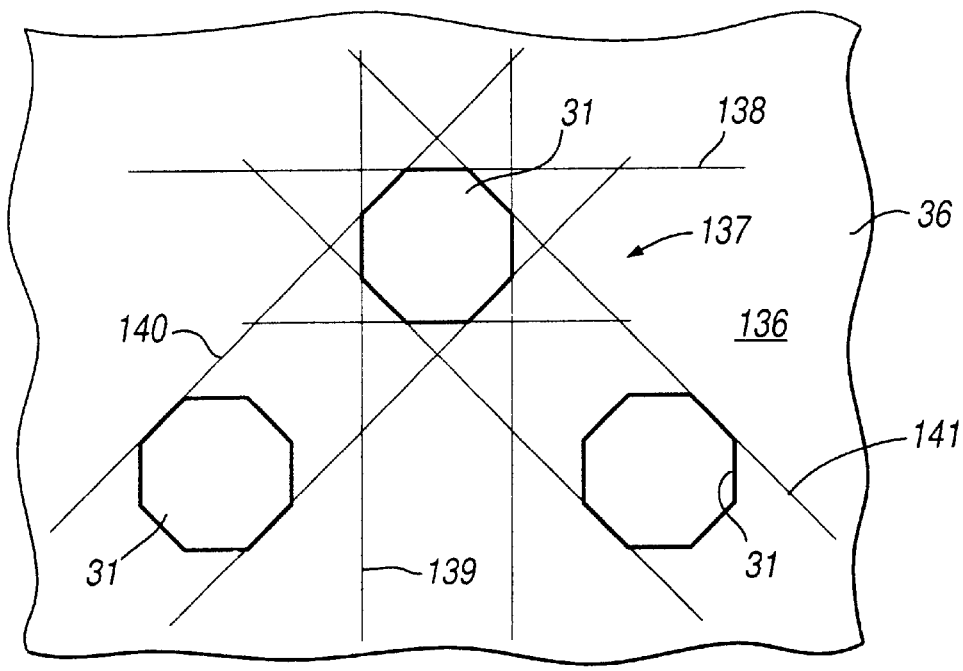
FIG. 6 is a schematic representation of a part of the facing sheet of the panel illustrated in FIGS. 2 and 3 as modified in accordance with the third and ninth aspects of the invention.

As illustrated in FIG. 6, the facing sheet 36 takes the form of a fibre reinforced composite comprising a matrix component 136 and a fibre reinforcing component 137 having arrays of fibres 138, 139, 140 and 141 with fibre directions of 0°, 90° and +45° and −45° and the holes in the facing sheet are arranged to have an octagonal cross-section with sides arranged parallel to the fibre directions.

Figure 7:
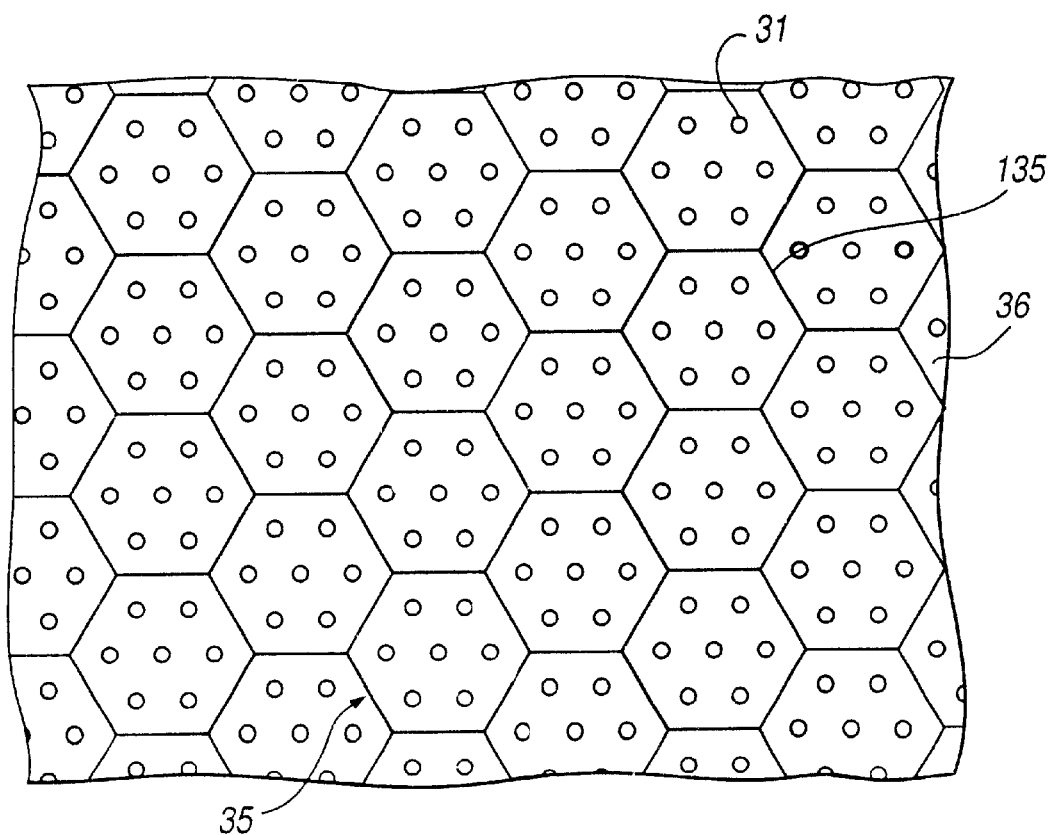
FIG. 7 is a schematic representation of a part of the facing sheet of the panel illustrated in FIGS. 2 and 3 as modified in accordance with the fourth and tenth aspects of the invention.

In accordance with the fourth and tenth aspects of the invention and as illustrated in FIG. 7 the holes 31 are so formed in the facing sheet 36 that no holes appear at locations of the facing sheet 36 which in the assembled panel 33 are contiguous with end portions of the walls 135 of the cellular core structure 35.

Figure 8:
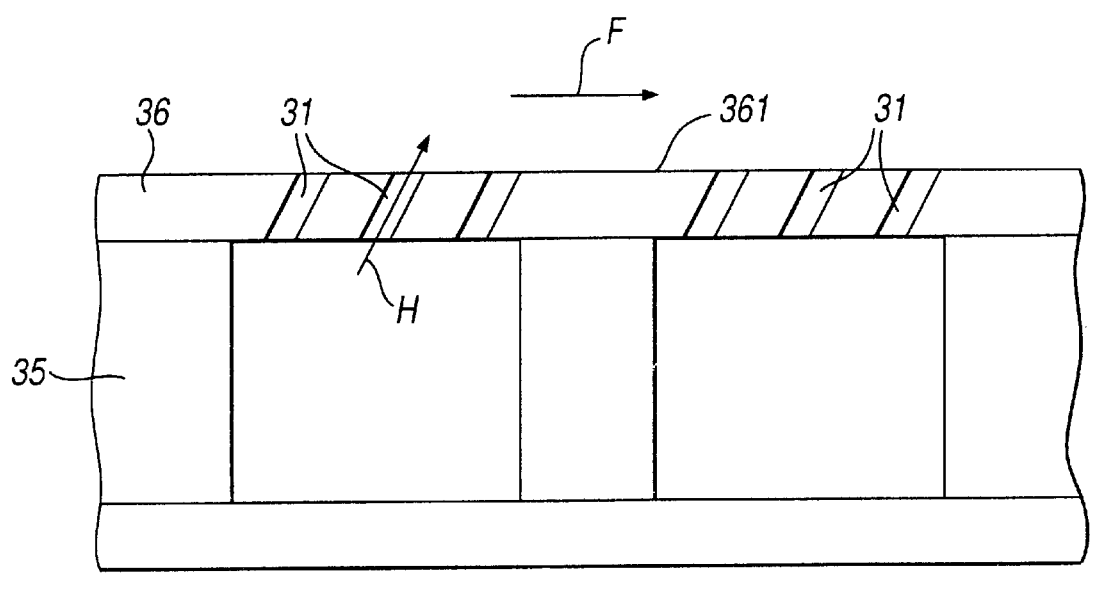
FIG. 8 is a schematic sectional view of a part of the noise attenuation panel as shown in FIGS. 2 and 3 with the facing sheet of the panel modified in accordance with the fifth and eleventh aspect of the invention.

In accordance with the fifth and tenth aspects of the invention and as illustrated in FIG. 8 the multiplicity of holes 31 through the facing sheet 36 take the form of an array of holes which pass through the facing sheet 36 from the rear face adjacent the front face of the cellular core structure 35 to the front face 361 of the facing sheet 36 in a hole direction H inclined, as shown, the normal to the front face 361.

The panel 33 as described with reference to FIGS. 2 and 3 and FIG. 8 is located within the propulsive power unit shown in FIG. 1 in any of the three locations indicated by the panels 15, 17 and 18 at which locations the panel is subjected to gaseous flow over the surface of the front face 361 of the facing sheet 36 in a fluid flow direction indicated by the arrow F in FIG. 8. In the embodiment of the invention illustrated in FIG. 8 it is arranged that hole direction H has a component along the front face 361 of the facing sheet 36 which is in the same direction as the fluid flow direction F.

A suitable panel construction and manufacturing cycle in the production of a noise attenuation panel according to the invention in its different aspects is set out below.

Panel Construction (1) Backing Sheet

Reinforcement: carbon (woven, undirectional, noncrimp fabric

Resin System: thermoset or thermoplastic

Lay-up: Isotropic, quasi-isotropic, orthogonal

Typical construction: 3K carbon tows woven in a 8 harness configuration and epoxy matrix (3–4 plies 0.045"–0.60"thick)

(2) Honeycomb Core

Core types: (i) nomex (aramid), (ii) glass reinforced phenolic dipped, (iii) metallic e.g. Aluminium alloy Isolation Layer may be Used Between Metallic Core and Carbon Composite Component (3) Facing Sheet Laser drilled perforate: Hot laser ($CO_2$ YAG); cold laser (UV Excimer)

Reinforcement: Carbon or glass or aramid (woven or undirectional or non-crimp fabric)

Resin System: Thermoset or thermoplastic

Lay-up: Isotropic, quasi-isotropic, orthogonal

Typical construction: 3K carbon tows woven in an 8 harness configuration and epoxy matrix (2 to 3 plies 0.032"–0.045" thick)

The laser drilling is performed on a precured laminate which has the finished component contour.

Manufacturing Cycle

Scenario 1 (Hot' and 'Cold' Laser Drilling)

(1) Precure backing sheet (Prepeg plies
(2) Precure facing sheet (consolidated/cured under
to profile (pressure in autoclave
(3) Laser drill facing sheet
(4) Reticulate adhesive onto honeycomb core or perforated facing sheet
(5) Assemble backing sheet, honeycomb core and facing sheet and bond together.

(1) Precure backing sheet (Prepreg plies
(2) Precure facing sheet (consolidated/cured under to profile (pressure in autoclave
(3) Laser drill facing sheet
(4) Reticulate adhesive onto honeycomb core or perforated facing sheet
(5) Assemble backing sheet, honeycomb core and facing sheet and bond together.

Scenario 2 ('Cold' Laser Only)

(1) Precure backing sheet (Prepeg plies
(2) Precure facing sheet (consolidated/cured under
to profile (pressure in autoclave
(3) Assemble backing sheet, honeycomb core and facing sheet and bond together.
(4) Laser drill facing sheet in bonded assembly.

(1) Precure backing sheet (Prepreg plies
(2) Precure facing sheet (consolidated/cured under to profile (pressure in autoclave (3) Assemble backing sheet, honeycomb core and facing sheet and bond together (4) Laser drill facing sheet in bonded assembly.

The Honeycomb Core is Bonded to the Backing Sheet with Film Adhesive. The Core or the Facing Sheet is Reticulated with Adhesive to Facilitate Bonding at the Honeycomb/Facing Sheet Interface Perceived benefits and advantages gained by panels constructed with facing sheets have a hole geometry and distribution according to the invention in its different aspects are set out below.

(1) Flexibility of Hole Geometry (Use of 'Hot' and 'Cold' Laser)

Simple perforate liners with holes typically 0.040" diameter have a high NLF (Non Linearity Factor), meaning that their attenuating performance, whilst good at the design point will likely degrade at other operating conditions. Linear liners, comprising a very large number of very small holes offer a surface impedance which is invariant as conditions in the duct change. Linear liners are usually found to perform better over a wide range of engine operating conditions.

Liner design studies have shown that the optimum Non Linearity Factor lies somewhere between the two extremes, albeit closer to the linear liner than the simple perforate liner. The enhanced perforate liner, with very small holes produced by whatever means rather than by use of a mesh (current construction—carbon open weave and stainless steel mesh), offers the ability to target the optimum NLF for any particular application.

Linear liners formed by wire mesh on a support sheet are prone to corrosion, wire mesh disbond, poor cosmetic quality; also require uniform properties, etc. The perforate liner offered has a host of benefits in simplifying manufacture and providing a better quality and more robust liner.

Liner design studies have also indicated acoustic benefit from varying impedance properties (that is the open area) across the facing sheet. Analysis is also showing acoustic benefit to be gained from 3D distributed liners. Complex variation in hole geometry and distribution across the facing sheet is possible with the perforate liner, lending itself therefore to a very flexible liner design.

Variations in hole geometry and distribution across the facing sheet also give rise to the following benefits:

(i) Varying hole shape—the hole shape can be tailored for any given open area to maximise structural strength (e.g. octagonal for quasi-isotropic (see FIG. 6), rectangular for orthogonal) and acoustic performance.

(ii) Variable hole area and spacing—this tailors the open area according to the acoustic requirement. The hole size and spacing may vary from panel to panel, and also over one panel. Provides very small hole capability enabling enhanced perforate.

(iii) Hole geometry can be tapered through the thickness to reduce blockage effects and and provides self cleaning mechanism.

(2) Fixed Depth Drilling ('Cold' Laser Only)

It is possible with the 'cold' Excimer UV laser to drill the perforations in the facing sheet after the bond (i.e. the precured backing sheet, the honeycomb core and the facing sheet laminate are bonded together and the finished component is then laser drilled (see Scenario 2 above).

Fixed depth drilling offers the following production advantages:

perforation technique not in critical path no reticulation process necessary can handle 3D curvature (potentially using a universal fixture)

better material utilisation full automation potential i.e. perforating with online quality assurance/self diagnosis systems Fixed depth drilling offers the following customer/cosmetic advantages:

no resin bleed through to facing sheet surface ability to paint composite facing sheet to customer requirements ability to apply scuff or erosion resistant coatings (organic)

Fixed depth drilling process ('Cold' laser only) is also able to identify/predict (via e.g. depth variations, ultrasonic probe, visual means) the locations of the honeycomb cell walls (subsequent to bonding of backing sheet, facing sheet and honeycomb core) and to drill the holes within the cell. None of the holes need be coincident with the cell wall which blocks them acoustically. In this way the panel is more structural because it will have less holes in it for the open area required. This is attributed to the tighter open area tolerance (and therefore acoustic performance) that may be achieved since there does not have to be an allowance made for hole blockage caused during bonding due to adhesive bleed or honeycomb cell wall alignment.

While an ultrasonic probe may be found appropriate for use in detection of the locations of the honeycomb cell walls (subsequent to bonding of the backing sheet, facing sheet and honeycomb core) it will be appreciated that other non-destructive detection techniques may also be employed.

Such non-destructive detection techniques with potential for honeycomb cell wall detection through the facing sheet include:

1. Visual Systems
2. Techniques identified as primarily Ultrasonic based including:
   (i) Laser coupled systems (non contact)
   (ii) Air coupled systems (non contact)
   (iii) Acoustography—(Large area "Real-time" immersion systems)
   (iv) Filmless Radiography
   (v) Multi-array transducers (in-service applications)

Among the appropriate new techniques are included: Microwave; Tomography; Thermography; RTUIS @ Dassault; Acoustic Doppler—RAID; Video Ultrasound—Acoustocam; ANDSCAN—(In-service) and MAUS—(In-service).

Advantages to be gained from the use of the present invention according to its different aspects include:

1. The hot laser can be used to produce perforations in the facing sheet prior to assembly or when the honeycomb core is bonded to it provided a system which can detect the honeycomb cell walls is in operation.
2. The ability to drill in the centre of each cell by detecting the honeycomb cell walls is optimum both acoustically and structurally.
3. Independent of whether the honeycomb cell walls can be detected or not, hole cutting of the complete bonded assembly using the Eximer laser has the advantages of avoiding the reticulation stage and avoiding aesthetically poor cosmetic bleed through of adhesive together with all the other advantages mentioned including, for example, the drilling of facing sheets which are painted or provided with a protective coating.
4. Use of the Eximer laser allows a hole to be trepanned/cut to a known predetermined depth so that honeycomb or adhesive below the facing sheet will not be damaged. Also this technique (unlike other hot laser techniques) does not produce a "heat affected zone" (an area adjacent the hole periphery where the laser heat has destroyed the resin matrix) and as a consequence provides a facing sheet with improved structural characteristics.

5. For a specified open perforate area (determined acoustically for an aeroengine) the most structural facing sheet will be obtained by drilling perforations using the Eximer laser, to a hole geometry which suits the fiber lay-up orientations of the facing sheet and which has holes in the cell centre, away from the cell walls.

Laser Parameters

In order to obtain high hole quality and rapid processing speeds, it is necessary to determine the optimum combination of parameters such as laser wavelength, repetition rate ("cutting speed'), pulse length, energy and drilling technique.

The following drilling techniques are available:

(i) Percussion Drilling

In percussion drilling the laser beam which is used to create the hole is about the same size as the drilled hole. This is achieved by controlling the profile of the focussed beam or by mask projection imaging.

(ii Trepanning Drilling

In trepanning, the laser beam is significantly smaller than the drilled hole and is scanned around the circumference of the hole to allow the material in the centre of the hole to fall out. The hole may be created using one pass of the laser or by a number of passes. Also, the holes can be drilled one at a time (single hole trepanning) or an array of holes can be trepanned together—the laser moving between holes after each pass of the laser beam (hole array trepanning).

In production, it is the aim to maximise the drilling rate. This is achieved by minimising the amount of material removed by the laser. During percussion drilling, the laser energy is used to remove all the material contained within the volume of the hole. When trepanning, only a narrow annulus of material is removed and the drilling rate is consequently faster. In addition, changing the hole shape is simpler and easy to vary. As a consequence trepanning is preferred but both techniques can be used.

Whenever possible, heat generated during laser perforation should be allowed to dissipate, that is to say, prevented from building up to the level that would result in heat affected zones (HAZ)—burnt & missing resin and damaged fibres of the composite around hole.

Normally, a laser operating at an Ultra Violet wavelength (200–400 nm)would be the best choice, as this would generate the minimum amount of heat. However, the cutting rate is too slow for production. An alternative way of minimising the heat is to use a laser operating at a visible or infrared wavelength but choose high laser energy pulse and keep the laser beam moving at high speed.

The following are the preferred types of Laser/energy and repetition rates.

| Preferred Systems | Typical Wavelength |
| --- | --- |
| Solid state - Nd:YAG - flashlamp pumped | 355, 532 &1064 nm |
| High energy per pulse - low repetition rate. | |
| Solid state - Nd:YAG - diode pumped | 355 nm |

| Preferred Systems | Typical Wavelength |
| --- | --- |
| Low energy per pulse - high repetition rate. | |
| Solid state - Nd:YV0 - diode pumped | 1064 nm |
| Low energy per pulse - high repetition rate | |

Hot Lasers such as CO2 lsers may also be used because of their high cutting rates. They will, however, give rise to heat affected zones and a possible reduction in product quality.

It will be appreciated that in addition to facilitating hole size and shape, using a laser to produce the perforations allows the holes also to be cut at an angle to surface of the facing component part of the panel, for practical purposes up to an angle of 45 degrees. This could have the following benefits:

Acoustic: Improved attenuation due to the creation of a more complex flow path to the Helmholtz tubes of the cellular structure (Honeycomb)

Aerodynamic: To reduce any drag effect produced by the airflow.

Structural: By off setting the weakness of structure at the hole ply by ply.

Clogging: Reduce the tendency of clogging of the holes by align the cutting axis with the airflow.

The drilling of inclined holes would however increase the time to generate the hole and increase the risk of edge damage.

It will be appreciated that the panels produced in accordance with the invention may include a facing sheet having holes with two or more of the hole characteristics hereinbefore described with reference to FIGS. 4 to 6.

What is claimed is:

1. A method of manufacturing a noise attenuation panel which comprises:
    a cellular component part which:
        has a front face and a rear face and
        a cell defining wall structure which defines a multiplicity of cells between the front face and the rear face, and
    a facing component part which:
        has a front face and a rear face,
        extends across the ends of the cells of the cellular component part at the front face thereof with the rear face of the facing component part adjacent the front face of the cellular component part, and
        is provided with a multiplicity of holes which extend through the facing component part from the front face to the rear face to provide gaseous fluid communication between the cells of the cellular component part and the front face of the facing component part for the attenuation of noise generated by gaseous fluid flow over the surface of the front face of the facing component part,
    characterised in that:
        the method comprises producing, in a hole producing step, the multiplicity of holes through the facing component part in the form of an array of holes which pass through the component part from the rear face of the facing component part to the front face of the facing component part in a predetermined hole direction inclined to the normal to the front face.

2. A method according to claim 1 wherein the inclination of the holes is so chosen as to provide flow paths to the cell defining structure which optimise attenuating performance of the panel.

3. A method according to claim 2, wherein the facing component part is a multi-ply structure comprising a plurality of superposed ply elements and wherein the holes are so inclined as to offset structural weakness of the multi-ply structure in the region of the holes.

4. A method according to claim 1 wherein the panel is so located as to be subjected to gaseous fluid flow over the surface of the front face of the facing component part in a predetermined fluid flow direction and wherein the predetermined hole direction has a component along the front face of the facing component part which is in the same direction as the predetermined fluid flow direction.

5. A method according to claim 1, wherein the holes are so inclined as to reduce the tendency of the holes to become clogged by debris carried in the gaseous fluid flow over the front face of the facing component part.

6. A method of manufacturing a noise attenuation panel which comprises:

a cellular component part which:
   has a front face and a rear face and
   a cell defining wall structure which defines a multiplicity of cells between the front face and the rear multiplicity of cells between the front face and the rear face and which terminate in end portions at the front face of the cellular component part, and a facing component part which:
   has a front face and a rear face,
   extends across the ends of the cells of the cellular component part at the front face thereof with the rear face of the facing component part adjacent the front face of the cellular component part, and
   is provided with a multiplicity of holes which extend through the facing component part from the front face to the rear face to provide gaseous fluid communication between the cells of the cellular component part and the front face of the facing component part for the attenuation of noise generated by gaseous fluid flow at the surface of the front face of the facing component part, and characterized in that:
      laser drilling is employed to drill the holes such that no holes are drilled at locations of the facing component part which in the assembled panel are contiguous with the end portions of the walls of the cell wall structure.

7. A method according to claim 6, wherein the method includes:
   bringing the two component parts together in an assembly step in the formation of the noise attenuation panel,
   carrying out the hole producing step after the assembly step, and
   carrying out the laser drilling under the control of an ultrasonic probe identifying wall end portion locations.

8. A method of manufacturing a noise attenuation panel which comprises:

a cellular component part which:
   has a front face and a rear face and
   a cell defining wall structure which defines a multiplicity of cells between the front face and the rear face, and a facing component part which:
   has a front face and a rear face,
   extends across the ends of the cells of the cellular component part at the front face thereof with the rear face of the facing component part adjacent the front face of the cellular component part, and
   is provided with a multiplicity of holes which extend through the facing component part from the front face to the rear face to provide gaseous fluid communication between the cells of the cellular component part and the front face of the facing component part for the attenuation of noise generated by gaseous fluid flow at the surface of the front face of the facing component part,
characterised in that:
   the facing component part is in the form of a fibre reinforced composite comprising a matrix component and a fibre reinforcing component embodied within the matrix component,
   the fibre reinforcing component comprises arrays of fibres in which the fibres of each array extend in a predetermined direction in the matrix and in which the predetermined direction of the fibres of each array is different from that of the fibres of each of the other arrays, and
   the holes in the facing component part are so produced as to have a polygonal cross-section with sides arranged parallel to the predetermined directions of the fibres of the arrays.

9. A method according to claim 8, wherein the arrays of reinforcing fibres comprise first, second, third and fourth arrays of fibres having fibre directions of 0°, 90°, and +45° and −45° and wherein the polygonal cross-section of the holes in the facing component part is an octagonal cross-section.

10. A method according to claim 8, wherein the arrays of reinforcing fibres comprise first and second arrays of fibres having fibre directions of 0° and 90°, or +45° and −45° and wherein the holes formed in the facing component part are so produced as to have a four sided polygonal cross-section with sides arranged parallel to the fibre directions.

11. A noise attenuation panel which comprises:

a cellular component part which:
   has a front face and a rear face and
   a cell defining wall structure which defines a multiplicity of cells between the front face and the rear face, and a facing component part which:
   has a front face and a rear face,
   extends across the ends of the cells of the cellular component part at the front face thereof with the rear face of the facing component part adjacent the front face of the cellular component part, and
   is provided with a multiplicity of holes which extend through the facing component part from the front face to the rear face to provide gaseous fluid communication between the cells of the cellular component part and the front face of the facing component part for the attenuation of noise generated by gaseous fluid flow at the surface of the front face of the facing component part,
characterised in that:
   the facing component part is in the form of a fibre reinforced composite comprising a matrix component and a fibre reinforcing component embodied within the matrix component,
   the fibre reinforcing component comprises arrays of fibres in which the fibres of each array extend in a predetermined direction in the matrix and in which the predetermined direction of the fibres of each array is different from that of the fibres of each of the other arrays, and
   the holes in the facing component part have a polygonal cross-section with sides arranged parallel to the predetermined directions of the fibres of the arrays.

12. A panel according to claim 11, wherein the arrays of reinforcing fibres comprise first, second, third and fourth arrays of fibres having fibre directions of 0°, 90° and +45° and −45° and wherein the holes in the facing component part have a octagonal cross-section with sides arranged parallel to the fibre directions.

13. A panel according to claim 12, wherein the arrays of reinforcing fibres comprise first and second arrays of fibres having fibre directions of 0° and 90°, or +45° and −45° and wherein the holes formed in the facing component part have a four sided polygonal cross-section with sides arranged parallel to the fibre directions.

14. A method of manufacturing a noise attenuation panel which comprises:
- a cellular component part which:
  - has a front face and a rear face and
  - a cell defining wall structure which defines a multiplicity of cells between the front face and the rear face, and
- a facing component part which:
  - has a front face and a rear face,
  - extends across the ends of the cells of the cellular component part at the front face thereof with the rear face of the facing component part adjacent the front face of the cellular component part, and
  - is provided with a multiplicity of holes which extend through the facing component part from the front face to the rear face to provide gaseous fluid communication between the cells of the cellular component part and the front face of the facing component part for the attenuation of noise generated by gaseous fluid flow at the surface of the front face of the facing component part,
- characterised in that:
  - the method comprises producing, in a hole producing step, the multiplicity of holes through the facing component part in the form of an array of holes having at least one hole characteristic selected from the group consisting of:
    - holes having a hole size which so varies over the facing component part as to provide optimum attenuating performance of the panel over a predetermined range of gaseous flow conditions at the front face of the facing component part
    - holes having a non-circular hole cross-section which is so chosen as to provide optimum combined structural strength and attenuating performance of the panel
    - holes having a predetermined hole direction inclined to the normal to the front face of the facing component part
    - holes having no locations on the facing component part which in the assembled panel are contiguous with the walls of the cell defining wall structure, and
    - holes having a polygonal cross-section.

15. A method according to claim 14, wherein the holes in the facing component part are produced by laser drilling.

16. A method according to claim 14, wherein the method includes:
- bringing the two component parts together in an assembly step in the formation of the noise attenuation panel, and
- carrying out the hole producing step prior to the assembly step.

17. A method according to claim 16 wherein the holes in the facing component part are produced by laser drilling and wherein the laser drilling is carried out using a high intensity laser.

18. A method according to claim 17, wherein the high intensity laser is a $CO_2$ or YAG laser.

19. A method according to claim 14, wherein the method includes:
- bringing the two component parts together in an assembly step in the formation of the noise attenuation panel, and
- carrying out the hole producing step after the assembly step.

20. A method according to claim 19 wherein the holes in the facing component part are produced by laser drilling and wherein the laser drilling is carried out using a low intensity laser.

21. A method according to claim 14, wherein:
- the panel further comprises a backing component part extending across the rear face of the cellular component part, and
- the assembly step comprises bringing the three component parts together in the formation of the noise attenuation panel.

22. A method according to claim 14, wherein the holes of the array have bore configurations which minimise blockage by debris deposited by the gaseous flow therethrough.

23. A method according to claim 14, wherein:
- the facing component part is in the form of a fibre reinforced composite comprising a matrix component and a fibre reinforcing component embodied within the matrix component, and
- the laser drilling is carried out on the composite after precuring of the matrix component.

24. A method according to claim 23, wherein:
- the facing component part and the cellular component part are required to follow a predetermined contour for the panel when assembled, and
- the precuring of the facing component part is carried out to the predetermined contour for the panel.

25. A noise attenuation panel which comprises:
- a cellular component part which:
  - has a front face and a rear face and
  - a cell defining wall structure which defines a multiplicity of cells between the front face and the rear face, and
- a facing component part which:
  - has a front face and a rear face,
  - extends across the ends of the cells of the cellular component part at the front face thereof with the rear face of the facing component part adjacent the front face of the cellular component part, and
  - is provided with a multiplicity of holes which extend through the facing component part from the front face to the rear face to provide gaseous fluid communication between the cells of the cellular component part and the front face of the facing component part for the attenuation of noise generated by gaseous fluid flow at the surface of the front face of the facing component part,
- characterised in that:
  - the multiplicity of holes through the facing component part form an array of holes having at least one hole characteristic selected from the group consisting of:
    - holes having a hole size which so varies over the facing component part as to provide optimum attenuating performance of the panel over a predetermined range of gaseous flow conditions at the front face of the facing component part holes having a non-circular hole cross-section which is so chosen as to provide optimum combined structural strength and attenuating performance of the panel holes having a predetermined hole direction inclined to the normal to the front face of the facing component part holes having no locations on the facing component part which in the assembled panel are contiguous with the walls of the cell defining wall structure, and holes having a polygonal cross-section.

26. A panel according to claim 25, wherein the holes of the array have bore configurations which minimise blockage by debris deposited by the gaseous flow therethrough.

27. A panel according to claim 25, wherein:

the panel further comprises a backing component part extending across the rear face of the cellular component part.

28. An aircraft propulsive power unit having an engine core and a nacelle structure surrounding the core and defining a fan duct having inner and outer fan duct walls, wherein one or each of the fan duct walls is formed by or includes a noise attenuation panel according to claim 25.

29. An aircraft propulsive power unit having a gaseous flow duct including a noise attenuation panel according to claim 25.

* * * * *